ELUTION OF NUCLEAR FUEL AND RADIOACTIVE NUCLIDES

- ⊙ : CONCENTRATION OF URANIUM
- △ : CONCENTRATION OF RADIOACTIVE SUBSTANCES
- □ : CONCENTRATION OF ALUMINUM

DECOMPOSITION OF OXALIC ACID AS A FUNCTION OF EXPOSURE DOSE OF γ-RAYS

- ⊙ : CONCENTRATION OF URANIUM
- □ : CONCENTRATION OF ALUMINUM
- ▲ : CONCENTRATION OF DEUTERATED OXALIC ACID

FLOW RATE OF FILTERED SOLUTION AND PRESSURE TO THE FILTER AS A FUNCTION OF TIME

United States Patent Office 3,737,373
Patented June 5, 1973

3,737,373
METHOD OF DECONTAMINATING HEAVY WATER COOLED AND MODERATED REACTOR
Kenji Motojima and Hiroshi Sakurai, Mito, and Hiroshi Onishi, Yasuichi Sasaki, Mitsuru Koike, and Kaoru Ueno, Ibaragi-ken, Japan, assignors to Japan Atomic Energy Research Institute, Tokyo, Japan
Filed June 28, 1971, Ser. No. 157,548
Claims priority, application Japan, July 2, 1970, 45/57,260
Int. Cl. G21f 9/00
U.S. Cl. 176—37         6 Claims

ABSTRACT OF THE DISCLOSURE

A heavy water cooled and moderated reactor, its nuclear fuel assemblies, attached pipings and container can advantageously be decontaminated by employing a heavy water solution of deuterated oxalic acid. The radioactive substances, reactor materials, and/or nuclear fuels eluted in the solution are removed by decomposing the deuterated oxalic acid by means of an ionizing radiation.

BACKGROUND OF THE INVENTION

(1) Field of the invention

This invention relates to a method of decontaminating a heavy water moderated and cooled reactor, its nuclear fuel assemblies, attached pipings and container. Particularly, it relates to a decontaminating method comprising three stage treatment: (1) elution of the nuclear fuel such as thorium, uranium, plutonium and the like, fission products and other induced radioactive nuclides which are deposited onto the body of heavy water moderated and cooled reactor, nuclear fuel assemblies and attached pipings with a heavy water solution of deuterated oxalic acid; (2) decomposition of the oxalic acid used for above eluation by means of an ionizing radiation, and solidification of the contaminating substances such as dissolved reactor materials, nuclear fuel and radioactive materials; and (3) elimination of the solids and the ions in the heavy water by employing filtration, ion-exchange method or the like.

(2) Description of the prior art

In order to eliminate radioactive contamination from the body and housing of nuclear reactor and the attached pipings, the use of phosphoric acid or dilute dichromic acid solution has so far been used. However, with these cleaning processes, the cleaning reagents cannot be decomposed by irradiation and a great quantity of ion exchange resin is required for purifying the heavy water in a nuclear reactor, and therefore, it is not desirable to use the above acids as cleaning reagents for the decontamination of nuclear fuel or radioactivity in a heavy water moderated nuclear reactor.

The conventional methods mentioned above all have the inherent disadvantage that when heavy water is contaminated the reactivity of the reactor is lowered and the recovery of the cleaning reagent and of the eluted substances become difficult. The present inventors completed this invention on the basis of their finding out that, when deuterated oxalic acid is used as a cleaning reagent, this acid easily decomposes to form heavy hydrogen, carbon dioxide and the like by irradiation during the operation of the reactor and can be easily removed and the deposits or the ions derived from the reactor materials, nuclear fuel and radioactive materials which are formed by the decomposition of the oxalic acid can be easily removed by employing filtration and/or ion-exchange method.

Summary of the invention

The object of the present invention is to provide a decontaminating method which decontaminates a heavy water cooled and moderated reactor, nuclear fuel assemblies and other attached pipings by a simple operation in a short period of time.

The method of the present invention comprises the use of a heavy water solution of deuterated oxalic acid for decontaminating nuclear fuel, fission products and induced radioactive nuclides on the body of a nuclear reactor, nuclear fuel assemblies and attached pipings. Moreover, the present invention includes each process of decomposition of deuterated oxalic acid as a decontaminating reagents by irradiation in a nuclear reactor and of dissolution, deposition and filtration of reactor materials, nuclear fuel and radioactive nuclides.

According to the present invention, the nuclear fuel or radioactive nuclides deposited on the inner wall of the reactor results in water soluble complex ions by reaction with oxalic acid and dissolves in heavy water. Thereafter, when the oxalic acid is decomposed by irradiation, the dissolved substances mentioned above are converted to insoluble solids in this solution.

The deuterated oxalic acid to be employed in the present invention can be prepared by dissolving oxalic anhydride in heavy water and by distilling this solution under a reduced pressure, but the method of preparing the deuterated oxalic acid is not restricted to the above method.

The dose and dose rate of an ionizing radiation to be employed are sufficient to decompose the deuterated oxalic acid. Generally they are more than $10^5$ rad and $10^5$ rad/hr. respectively.

DESCRIPTION OF THE PREFERRED EMBODIMENTS

The present invention is further illustrated by way of the working example and the attached drawings. It should be noted that the example is given only for explanation and should not be taken as limiting the present invention.

EXAMPLE

Figure 1:
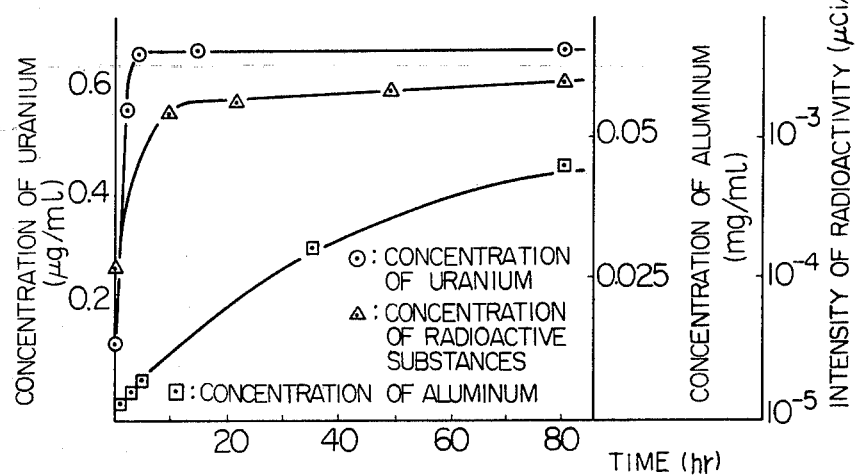
FIG. 1 shows the relationship between treating time and the amount of the eluted nuclear fuel and radioactive nuclides.

A heavy water solution of deuterated oxalic acid (at the temperature of 10–50° C., with the concentration of 0.01 mole per liter) was allowed to flow to the surfaces of nuclear fuel, reactor materials, nuclear fuel assemblies and the attached pipings contaminated with radioactive substances. As shown in FIG. 1, the nuclear fuel (uranium) and the radioactive substances on the surface of the reactor materials were dissolved in the solution within 10 hours, and thereafter the concentration of these substances in the solution remained constant. At the same time, a part of each section, reactor material, nuclear fuel assembly and attached pipings (mainly made of aluminum) were also dissolved in the solution.

Figure 2:
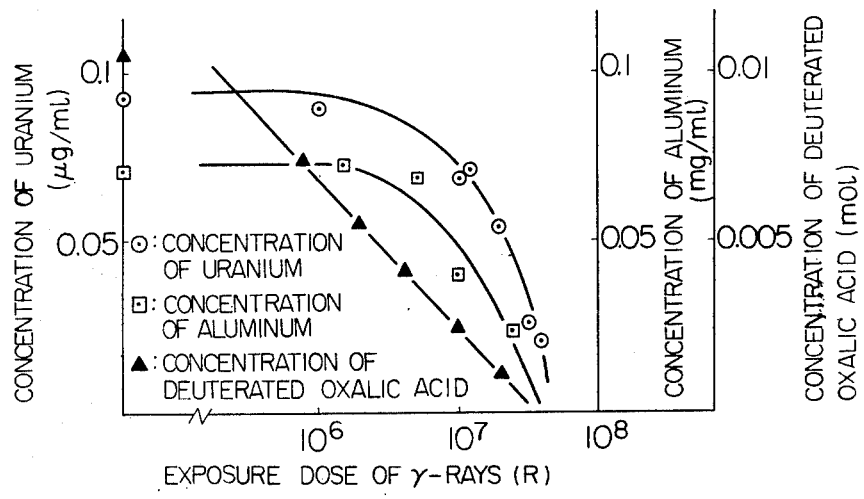
FIG. 2 shows the relationship between the exposure dose of $\gamma$-rays and the decomposed amount of deuterated oxalic acid and FIG. 3 shows the flow rate of filtered solution and the applied pressure to the filter as a function of time.

Thereafter this solution was irradiated with $\gamma$-rays. As shown in FIG. 2, the oxalic acid was almost completely decomposed with the exposure dose of $3 \times 10^7$ rad. As the oxalic acid decomposes, most of the dissolved reactor materials, nuclear fuel and induced radioactive substances was precipitated.

Figure 3:
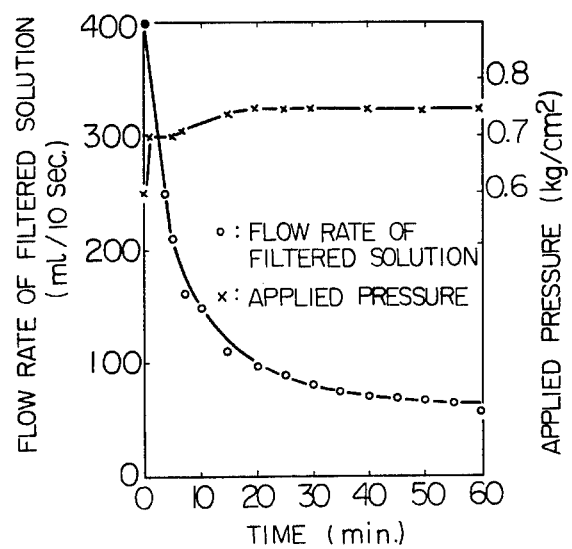

The precipitate was in the form of filterable granular particles 0.8–3μ in diameter. FIG. 3 shows the flow rate of the filtered solution and the input pressure of the solution to the filter as a function of time. Finally, the ions in the filtered heavy water were removed by means of known ion-exchange resin technique. The deuterium and tritium which were generated in the above process were oxidized to form heavy water again.

Very little data has been published on processes for decontaminating the body of heavy water moderated and cooled reactor, and the details of cleaning effect are not known, but according to the present invention, the cleaning of the inside walls of a nuclear reactor is completed within 10 hours after the addition of the oxalic acid, and thereafter the decomposition of the cleaning reagent (oxalic acid) and precipitation of the dissolved substances proceeds sufficiently during the operation of the reactor for a short time (about 1 hour). The precipitates can be filtered with a simple filtering means. The ionic contaminants which remain in the heavy water are removed by conventional ion-exchange technique. Accordingly, with the process of the present invention, the heavy water is not contaminated by the cleaning reagent and other substances.

The concentration of deuterated oxalic acid for the application of the present invention is not especially restricted, but a concentration of from about 0.001 mole per liter to saturation is preferable. Good results are obtained even when the temperature of the solution is in the range of about 10–50° C., and a solution at room temperature is generally employed.

What we claim is:

1. A method of decontaminating a heavy water moderated and cooled reactor, nuclear fuel assemblies and piping attached thereto, which comprises eluting nuclear fuel, fission products and radioactive nuclides deposited thereonto with a heavy water solution of deuterated oxalic acid, and decomposing the deuterated oxalic acid in the eluted solution by means of an ionizing radiation to remove the contaminants.

2. A method as set forth in claim 1, in which the eluted solution containing the decomposed oxalic acid is further treated with a filtration process and/or an ion-exchange process.

3. A method as set forth in claim 1, in which the heavy water solution of deuterated oxalic acid is employed at a concentration ranging from about 0.001 mol per liter to saturation.

4. A method as set forth in claim 1, in which the dose and dose rate of an ionizing radiation are sufficient to substantially decompose deuterated oxalic acid.

5. A method as set forth in claim 1, in which the irradiation with an ionizing radiation is carried out in the nuclear reactor to be decontaminated.

6. A method as set forth in claim 1, in which a heavy water solution of deuterated oxalic acid at room temperature is employed.

References Cited

UNITED STATES PATENTS

| 3,258,429 | 6/1966 | Weed | 176—37 |
| 3,496,017 | 2/1970 | Weed | 134—3 |

CARL D. QUARFORTH, Primary Examiner

H. E. BEHREND, Assistant Examiner

U.S. Cl. X.R.

134—3, 41; 252—301.1 R